(12) United States Patent
Henderson

(10) Patent No.: US 6,272,681 B1
(45) Date of Patent: *Aug. 7, 2001

(54) CABLE MODEM OPTIMIZED FOR HIGH-SPEED DATA TRANSMISSION FROM THE HOME TO THE CABLE HEAD

(75) Inventor: P. Michael Henderson, Tustin, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/358,299

(22) Filed: Jul. 21, 1999

Related U.S. Application Data

(63) Continuation of application No. 08/990,279, filed on Dec. 15, 1997, now Pat. No. 5,986,691.

(51) Int. Cl.[7] .................................................. H04N 7/173
(52) U.S. Cl. .......................... 725/126; 725/121; 725/131; 725/111
(58) Field of Search ..................................... 348/723, 725, 348/473, 475–479, 6, 7, 10–13; 455/3.1, 5.1, 4.2, 6.3, 109; 725/100, 109, 111, 121, 118, 126, 131

(56) References Cited

U.S. PATENT DOCUMENTS

| | | |
|---|---|---|
| 4,509,073 | 4/1985 | Baran et al. . |
| 5,124,980 | 6/1992 | Maki . |
| 5,321,514 | 6/1994 | Martinez . |
| 5,347,304 | 9/1994 | Moura et al. . |
| 5,421,030 | 5/1995 | Baran . |
| 5,425,027 | 6/1995 | Baran . |
| 5,587,743 | 12/1996 | Montgomery et al. . |
| 5,596,361 | 1/1997 | Martinez . |
| 5,617,148 | 4/1997 | Montgomery . |
| 5,663,682 | 9/1997 | Meline et al. . |
| 5,666,168 | 9/1997 | Montgomery et al. . |
| 5,734,413 | 3/1998 | Lappington et al. . |
| 5,805,591 | * 9/1998 | Naboulsi et al. ..................... 370/395 |
| 5,831,679 | 11/1998 | Montgomery et al. . |
| 5,870,134 | * 2/1999 | Laubach et al. ....................... 348/12 |
| 5,986,691 | * 11/1999 | Henderson .............................. 348/12 |
| 6,014,545 | * 1/2000 | Wu et al. .............................. 455/3.1 |

FOREIGN PATENT DOCUMENTS

WO 97/38529   10/1997 (EP) .

OTHER PUBLICATIONS

Counterman, Raymond. Integrated Services to the Home and Small Business Over A Service–Independent HFC Network. Proceedings of the SPIE, Oct. 23, 1995, vol. 2609, pp. 39–49, XP–000749691.

Doshi, Bharat T. et al. A Broadband Multiple Access Protocol for STM, ATM, and Variable Length Data Services on Hybrid Fiber–Coax Networks. AT&T Technical Journal, vol. 1, No. 1, Jun. 21, 1996, Summer 1996, pp. 36–65, XP 000635761.

Harman, Dale D. et al. Local Distribution for IMTV. IEEE Multimedia, vol. 2, No. 3, Sep. 21, 1995, pp. 14–22, XP 000529089.

* cited by examiner

*Primary Examiner*—Andrew Faile
*Assistant Examiner*—Ngoc Vu
(74) *Attorney, Agent, or Firm*—Foley & Lardner

(57) ABSTRACT

A cable modem provides upstream data signals in a cable system on a return channel. The upstream data signals are provided in a 50–550 MHz frequency range and yet do not affect the picture quality associated with conventional cable television signals. The data is provided on vestigial sidebands associated with the cable television signals or during black periods associated with the cable television signals. The data can be modulated in accordance with quadrature amplitude modulation (QAM) techniques.

20 Claims, 4 Drawing Sheets

CABLE MODEM OPTIMIZED FOR HIGH-SPEED DATA TRANSMISSION FROM THE HOME TO THE CABLE HEAD

CROSS REFERENCE TO RELATED APPLICATIONS

The present application is a continuation of Ser. No. 08/990,279, filed Dec. 15, 1997, now U.S. Pat. No. 5,986,691 which was granted on Nov. 16, 1999.

FIELD OF THE INVENTION

The present invention relates to cable communication systems. More particularly, the present invention relates to high-speed transmission of data from a home or residence to a central office or cable-head end.

BACKGROUND OF THE INVENTION

Conventional cable systems can utilize a cable modem to transmit and to receive data across a coaxial cable or line. The cable couples a head end or central office to numerous pieces of video equipment disposed in a multitude of residences.

Cable systems are generally utilized as one-way systems in which cable television signals are transmitted from the head end to the video equipment coupled to the cable. The video equipment can include video cassette recorders (VCRs), television units, or other devices. The cable television signals are transmitted in a frequency range from approximately 50 megahertz (MHz) to 550 MHz. The video equipment receives the cable television signals and either provides images in accordance with the cable television signals or stores the cable television signals.

Cable modems can be utilized with existing cable systems to communicate data bidirectionally between the home and the head end. The cable modem transmits data from the home to the head end in a frequency range between approximately 5–39/42 (e.g., on a return channel). Generally, the return channel can utilize a 5–39 MHz range (low split) or a 5–42 MHz range (mid split). The cable modem receives data from the head end in a frequency range between 550–750 MHz (e.g., the downstream channel). The high-speed, downstream channel is often utilized to provide digitized services, such as, digitized entertainment to the residence, or to provide other data communications to the residence.

The return channel is typically utilized to transmit small amounts of data, such as, requests for download information, while the downstream channel is utilized to transmit large amounts of data, such as, data associated with video signals, large programs, documents, or other applications. For example, in most internet applications, larger amounts of data are requested by the residential user than by the internet source. Further, in pay-per-view movie applications, the return channel is utilized to transmit relatively small data files, including billing and addressing information, while the downstream channel is utilized to transmit the relatively large data file, including the movie.

The conventional return channel is not adequate for all cable modem applications, especially applications in which larger amounts of data must be transmitted to the head end. Heretofore, the return channel associated with conventional cable modems can be susceptible to interference from a number of other radio frequency (RF) sources, including amateur radio units and household motors, which provide distortion in the 5–39/42 MHz range. Additionally, the bandwidth associated with the conventional return channel (e.g., 5–39/42 MHz) is somewhat limited, thereby restricting the amount of data which can be sent to the head end.

Since the frequency range between 50–550 MHz is utilized by all television sets coupled to the cable, it cannot conventionally be used for return channel applications. Indeed, the reception of all television sets would be affected by any signal placed in the frequency band between 50–550 MHz. Accordingly, conventional cable modems must transmit and receive data outside of the 50–550 MHz range to protect the reception of the large number of customers who are already committed to this aspect of the cable system. Thus, data cannot normally be transmitted upstream in the 50–550 MHz frequency range because of the multi-drop nature of the cable system.

Thus, there is a need for a high-speed return channel for cable modems. Further still, there is a need for more efficient use of the frequency band between 50–550 MHz in a cable system.

SUMMARY OF THE INVENTION

The present invention relates to a transmitter for use with a cable system including a cable. The cable is coupled between the transmitter and a cable-head end. The transmitter includes a terminal and a data modulator coupled to the terminal. The data modulator provides modulated data signals in a frequency band between 50–550 MHz across the cable, wherein the modulated data signals are transmitted so as not to interfere with reception of cable television signals.

The present invention further relates to a cable modem including a receiver means and a transmitter means. The receiver means receives analog television signals in a frequency range between 50–550 MHz. The transmitter means transmits data signals on a vestigial sideband of carrier waves between the 50–550 MHz frequency range. The transmission of the data signals does not adversely affect the picture quality associated with the analog television signals.

The present invention still further relates to a transmitter for use in a cable system. The transmitter provides data signals between 50–550 MHz on a return channel to a cable-head end. The transmission of the data signals does not adversely affect the picture quality associated with analog television signals in the 50–550 MHz frequency range.

According to one exemplary aspect of the present invention, a cable modem provides data signals outside of the conventional return channel frequency range between 5–39/42 MHz. The return channel utilizes a black period associated with cable television signals or a vestigial sideband associated with cable television signals to transmit data in the 50–550 MHz frequency range. The return channel advantageously does not adversely affect the reception of cable television signals in the 50–550 MHz frequency range.

BRIEF DESCRIPTION OF THE DRAWINGS

The present invention will hereafter be described with reference to the accompanying drawings, wherein like numerals denote like elements and.

DETAILED DESCRIPTION OF PREFERRED EXEMPLARY EMBODIMENTS

Figure 1:
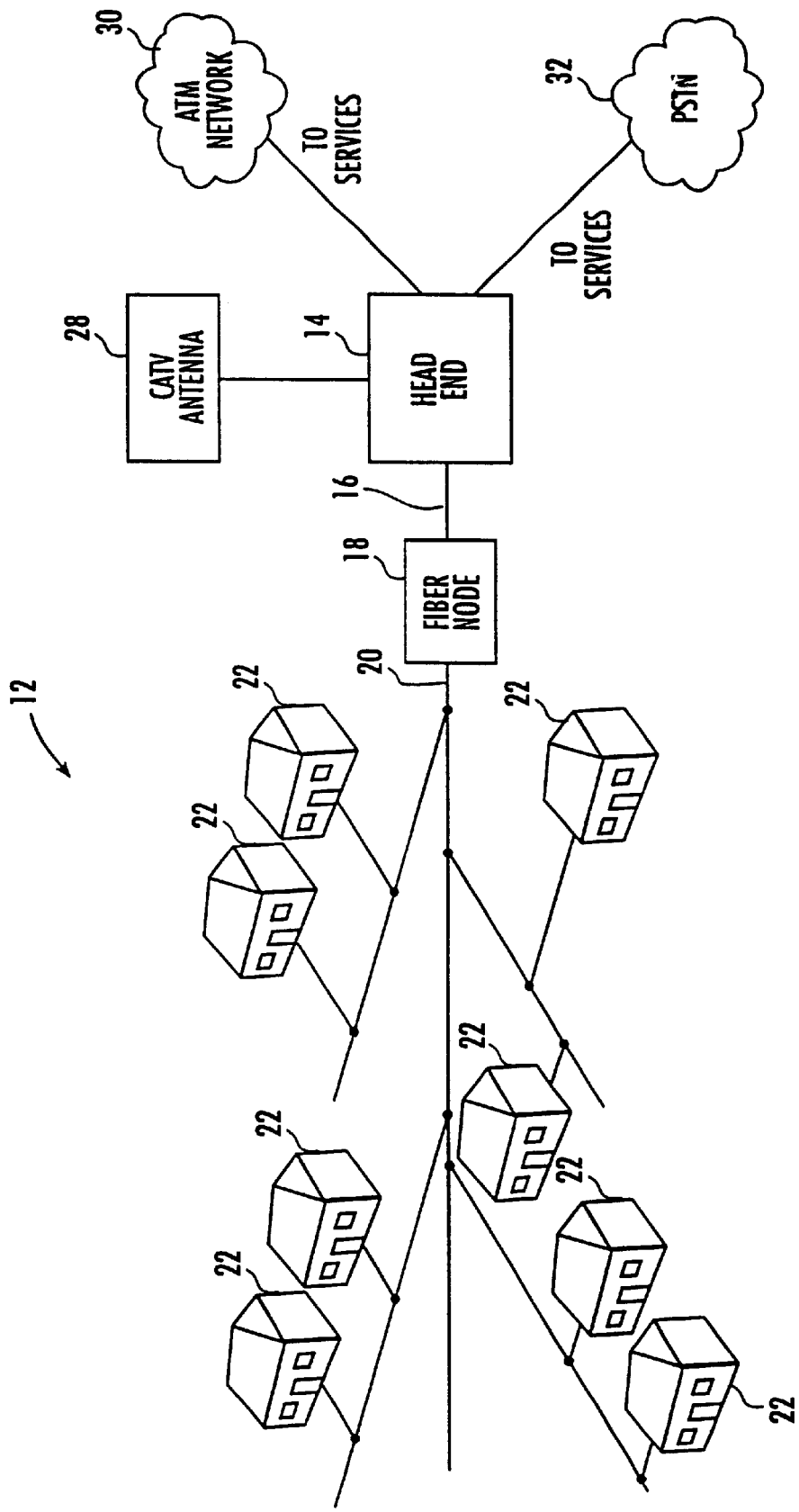
FIG. 1 is an exemplary block diagram of a cable system.

With reference to FIG. 1, a cable system 12 includes central office or a head end 14, a fiber optic cable 16, a fiber node 18, a coaxial cable 20, and a multitude of residences 22. Cable 20 is preferably an insulated coaxial cable of the type utilized by cable systems which provide cable television signals to residences 22. Fiber optic cable 16 couples head end 14 to fiber node 18. Fiber node 18 is coupled to cable 20.

Head end 14 can also be coupled to a satellite cable television antenna 28, an asynchronous transfer mode (ATM) network 30, a public switched telephone network (PSTN) 32, or other services. Head end 14 transmits and receives signals to antenna 28, network 30, and network 32. Head end 14 preferably receives cable television signals from antenna 28 and provides cable television signals across fiber optic cable 16 to fiber node 18. Fiber node 18 provides the cable television signal across cable 20 to residences 22. The cable television signals are analog signals within a frequency range approximately between 50–550 MHz.

Additionally, head end 14 can receive cable television signals from networks 30 or 32. Head end 14 can also receive data from network 30 and 32 and provide the data across cables 16 and 20 to residences 22. The data can include digitized services, digital entertainment, pay-per-view movies, or other information. For example, ATM network 30 can be coupled to the internet or worldwide web and information can be transmitted to and from the internet or worldwide web via cable 20 and cable 16.

Figure 2:
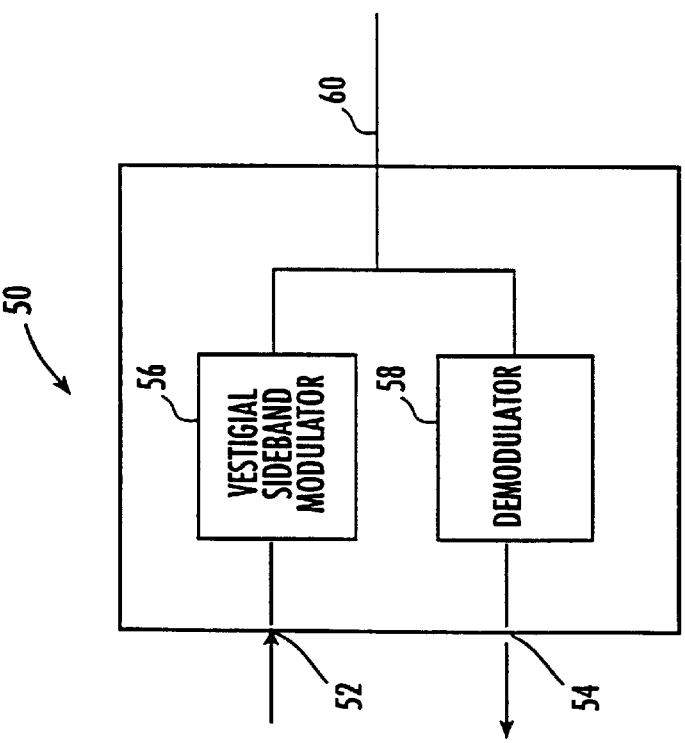
FIG. 2 is a general block diagram of a cable modem for use with the cable system illustrated in FIG. 1 in accordance with an exemplary embodiment of the present invention.

With reference to FIGS. 1 and 2, a cable modem 50 can be utilized in system 12 to communicate information across cable 20. Preferably, cable modem 50 is provided within residences 22. Cable modem 50 includes a data input 52, a data output 54, a modulator 56, a demodulator 58, and a terminal 60. Terminal 60 is a terminal preferably coupled to cable 20.

Cable modem 50 advantageously transmits data or digital information upstream (e.g., from residence 22 to head end 14) in the frequency range approximately between 50–550 MHz. In contrast to conventional modems which utilize a return channel in the frequency range between approximately 1–50 MHz, cable modem 50 utilizes the same frequency range for the return channel that is used for the cable television signals provided from head end 14 to residences 22. Data or digital information (e.g., modulated data signals) received by modem 50 from head end 14 across cable 20 is provided through demodulator 58 to output 54. The received data is preferably provided in the 550–750 MHz frequency range (e.g., on the downstream channel).

Cable modem 50 is advantageously arranged so modulated data signals transmitted within the 50–550 MHz frequency range do not interfere with the picture quality associated with the cable television signals. Preferably, cable modem 50 includes a modulator, such as, modulator 56, which is configured so that the picture quality associated with the cable television signals received by residences 22 is not affected by data transmitted upstream along cable 20. Preferably, modulator 56 is arranged as a vestigial sideband modulator.

Figure 3:
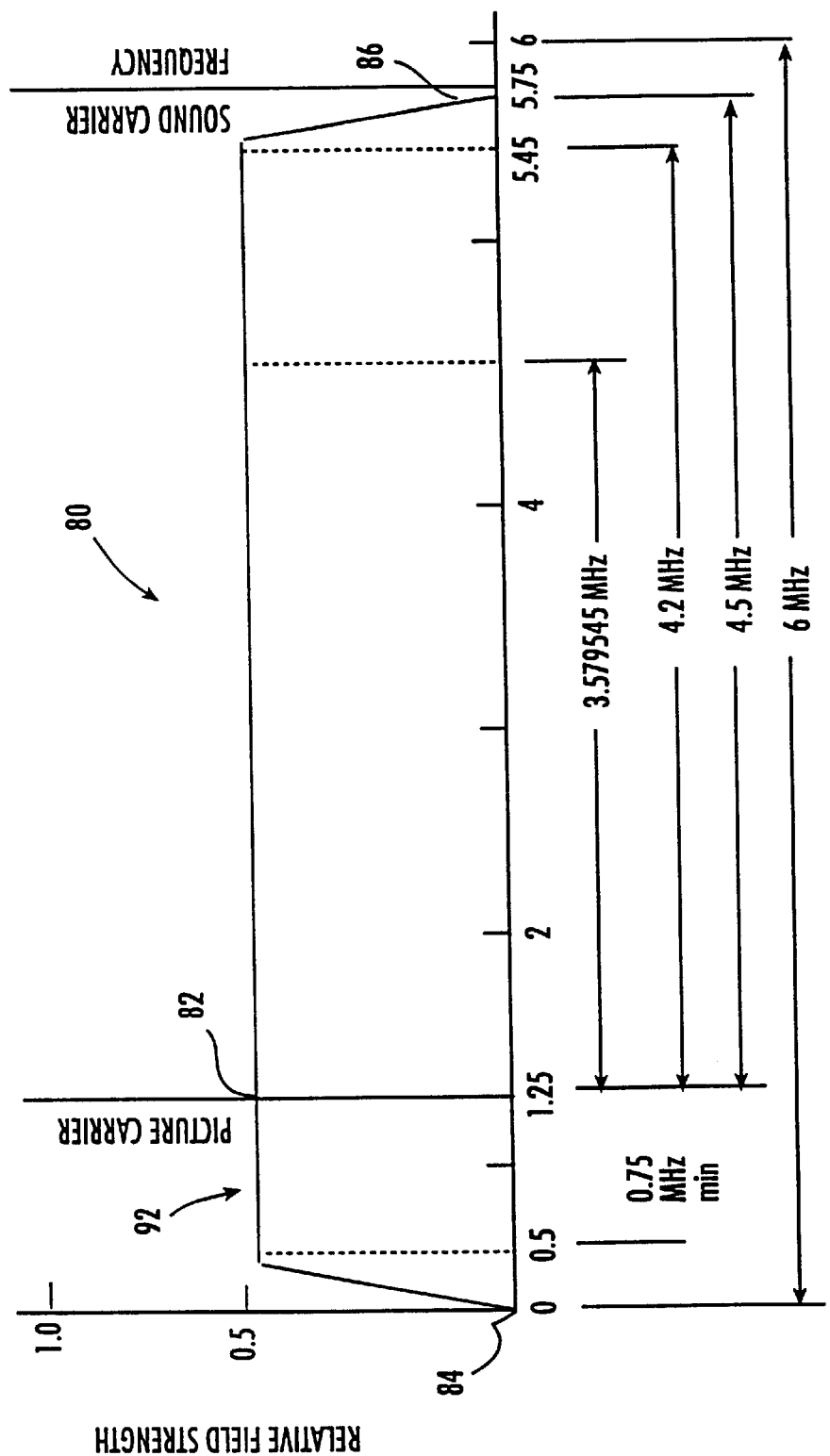
FIG. 3 is a drawing of the bandwidth spectrum of a television channel showing a vestigial sideband.

With reference to FIG. 3, an exemplary bandwidth spectrum of a cable television signal 80 is shown. Cable television signal 80 has a bandwidth of 6 MHz and is within the 50–550 MHz frequency range. The 6 MHz bandwidth represents a television channel.

A picture carrier frequency 82 is provided approximately 1.25 MHz from a starting frequency 84 associated with the channel. Information indicative of the picture associated with cable television signal 80 is modulated using a single sideband technique, wherein the picture information is contained between picture carrier frequency 82 and a frequency approximately 5.75 MHz above starting frequency 84. At a frequency 86, sound information can also be provided.

Cable television signal 80 is transmitted utilizing a single sideband technique, wherein only one sideband contributes to the recovery of the information encoded on the cable television signal. Modulator 56 (FIG. 2) preferably utilizes a vestigial sideband 92 associated with cable television signal 80. Vestigial sideband 92 is in a frequency range between 0.5–1.25 MHz above frequency 84. Vestigial sideband 92 preferably has a bandwidth of 0.75 MHz and does not interfere with other television channels since it is greater than frequency 84. Additionally, vestigial sideband 92 should not interfere with its own channel associated with signal 80 because it is below carrier frequency 82.

Figure 4:
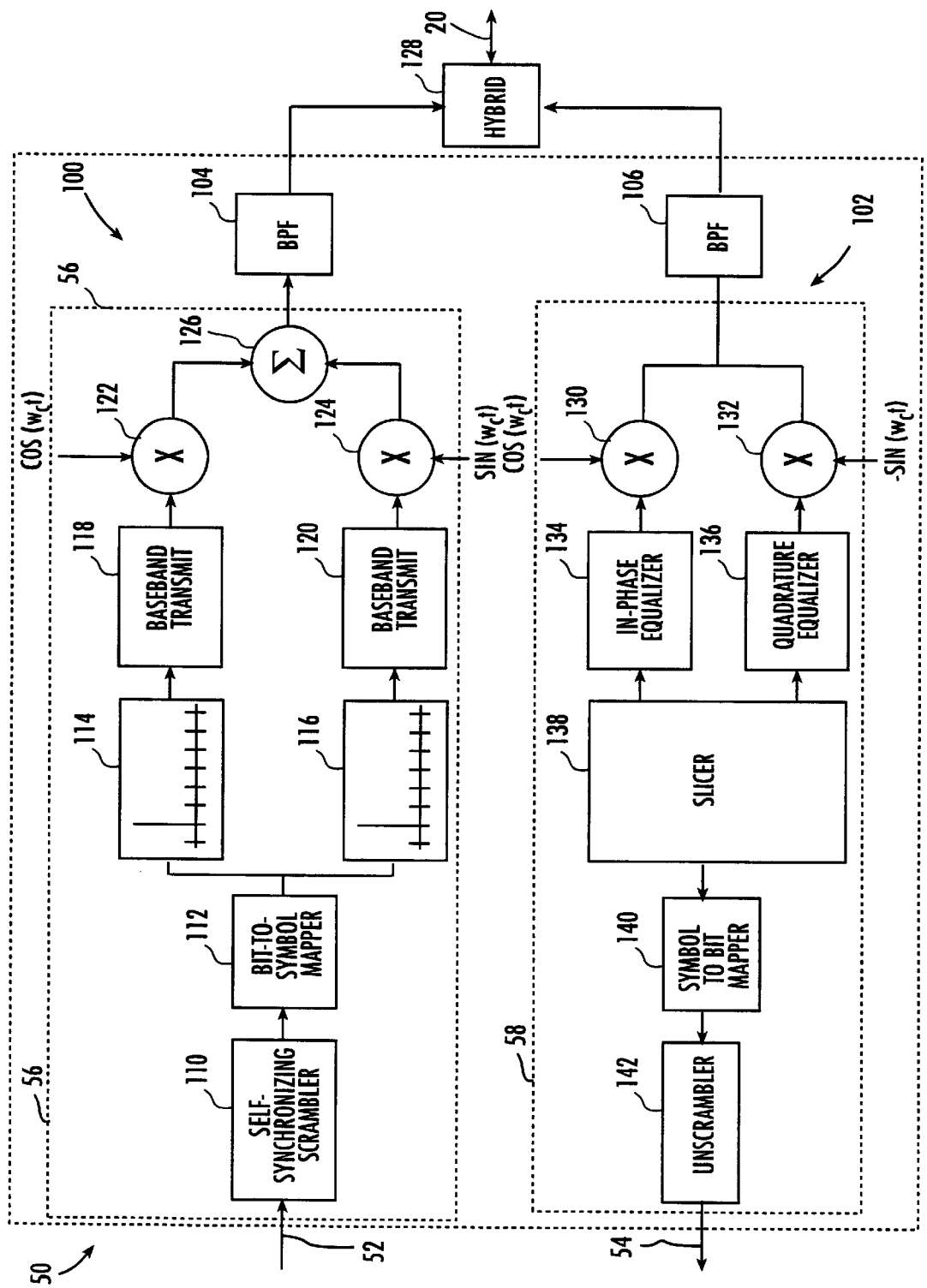
FIG. 4 is a more detailed block diagram of the cable modem illustrated in FIG. 2.

Modulator 56 (FIG. 2) preferably utilizes quadrature amplitude modulation (QAM) to provide modulation in vestigial sideband 92. Alternatively, modulator 56 could utilize phase shift key (PSK) modulation, frequency shift key modulation (FSK) or other types of modulation. Therefore, modem 50 (FIG. 2) is able to utilize the 50–550 MHz frequency range to transmit information upstream on cable 20 by utilizing vestigial sideband 92. Utilizing the vestigial sideband will not provide an adverse effect on picture quality associated with cable television signal 80. Modem 50 can use a vestigial sideband similar to sideband 92 on any channel between the 50–550 MHz frequency range. With reference to FIG. 4, modem 50 includes a transmitter 100, a receiver 102, and a hybrid circuit 128. Transmitter 100 includes a band pass filter 104 and modulator 56. Receiver 102 includes a band pass filter 106 and demodulator 58. Modulator 56 is a QAM modulator and includes a scrambler 110, a bit-to-symbol mapper 112, an in-phase pulse generator 114, a quadrature pulse generator 116, a base band transmit filter 118, a base band transmit filter 120, a mixer 122, a mixer 124, and a summer 126.

Data is provided at input 52 through self-synchronizing scrambler 110. The scrambled data is provided to bit-to-symbol mapper 112, which provides symbols to pulse generators 114 and 116. Pulse generators 114 and 116 provide quadrature pulse signals through base band transmit filters 118 and 120, respectively, to mixers 122 and 124. Mixers 122 and 124 provide up-converted signals to summer 126. Mixers 122 and 124 provide the up-converted signals in a vestigial sideband, such as, sideband 92. Summer 126 provides the modulated data signals (e.g., the summed, up-converted signals) in a vestigial sideband associated with cable television signals provided on cable 20.

The modulated data signals are provided through band pass filter 104 and then hybrid circuit 128 to cable 20. Signals received on cable 20 are provided through hybrid circuit 128 and band pass filter 106 to demodulator 58.

Demodulator 58 includes a mixer 130, a mixer 132, an in-phase equalizer filter 134, a quadrature equalizer filter 136, a slicer 138, a symbol-to-bit map 140, and an unscrambler 142. The modulated data signals are provided to mixers 130 and 132 and are down-converted. The down-converted signals are provided through equalizers 134 and 136 to slicer 138. Slicer 138 provides symbols representative of the modulated signals to symbol-to-bit mapper 140. Symbol-to-bit mapper 140 provides bit signals to unscrambler 142, which provides unscrambled data at output 54. The modulated data signals provided to mixers 130 and 132 are in the 550–750 MHz frequency range.

Figure 5:
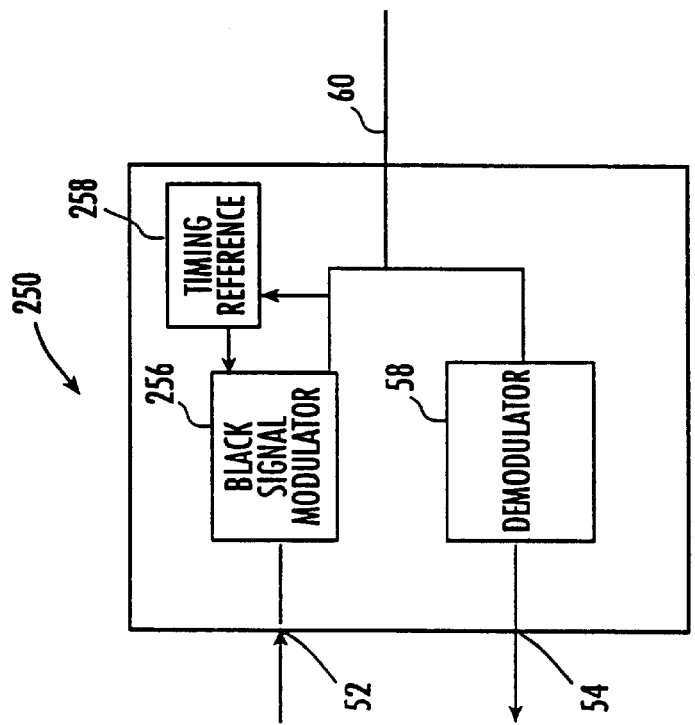
FIG. 5 is a general block diagram of a cable modem for use with the cable system illustrated in FIG. 1 in accordance with another exemplary embodiment of the present invention.

With reference to FIG. 5, a cable modem 250 in accordance with another exemplary embodiment, is shown. Cable modem 250 is similar to modem 50. However, cable modem 250 includes a black region modulator 256 instead of a vestigial sideband modulator 56. Modem 250, like modem 50, provides modulated data signals to cable 56 in the 50–550 MHz frequency band without interfering with the picture quality associated with the cable television signals.

Black region modulator 256 is coupled to a timing reference circuit 258, which is also coupled to terminal 60. Timing reference circuit 258 determines the black signal time periods associated with channels on the cable television signals. Black signal time periods are time periods when no information is provided on the cable television signal to accommodate a retrace operation associated with the cathode ray tube (CRT). During a retrace orientation, the cable television signal turns off the electron beam associated with the CRT so the retrace operation cannot be seen by the viewer.

The retrace operation can occur at the end of a horizontal trace or scan of the electron beam. At the end of the horizontal trace, the electron beam must fly back and start a next horizontal trace. A retrace operation can also occur when the scan reaches the bottom of the screen associated with the CRT, and the electron beam has to come back to the top of the screen. During these retrace time periods, the cable television signal is driven into a black region, which essentially turns off a transmission of the electron beam so the retrace operation cannot be seen on the screen.

Black signal modulator 256 is optimized to operate during the retrace time period to provide modulated data signals. The modulated data signals do not affect the cable television signals because they are occurring during retrace or flyback times (e.g., black regions of the cable television signals). The cable television signals are over-driven during the black regions so that the electron beam is totally turned off. Although the signal is over-driven, data still can be modulated on top of the over-driven signal. The data can be modulated with QAM, FSK, PSK, or other techniques. The use of black periods to include data has been utilized in other non-cable modem applications by companies, such as, "Datacast", to transmit data from a central source to computers at a relatively high rate.

With reference to FIG. 1, modems in head end 14 or fiber node 18 can utilize echo-canceling techniques to remove the transmitted cable television signals between 50–550 MHz frequency range to obtain the modulated information, whether it be on a vestigial sideband or in a black region of the cable television signals. Echo-canceling techniques used in order to transmit and to receive data on a single medium, are well-known in the art.

It is understood that, while the detailed drawings and specific examples given describe preferred exemplary embodiments of the present invention, they are for the purpose of illustration only. The method and apparatus of the present invention is not limited to the precise details and conditions disclosed. For example, although particular modulation and demodulation circuitry is described, other types of modulation and demodulation techniques can be utilized. In addition, modem 50 can be configured to utilize both the black region and the vestigial sideband, as well as, transmit in the 5–39/42 MHz frequency range, thereby maximizing the amount of data which can be transferred. Further, single lines in the drawings can represent multiple conductors. Thus, changes may be made to the details disclosed, without departing from the spirit of the invention defined by the following claims.

What is claimed is:

1. A transmitter for use with a cable system including a cable, the cable being coupled between the transmitter and a cable-head end, the cable system transmitting cable signals on channels having a first bandwidth, wherein the cable signals are modulated in a second bandwidth, the second bandwidth being less than the first bandwidth, the transmitter comprising:

a terminal; and a data modulator coupled to the terminal, the data modulator providing modulated data signals in a frequency band within one of the channels, wherein the modulated signals are provided in a third bandwidth within the first bandwidth and exclusive of the second bandwidth.

2. The transmitter of claim 1, wherein the cable is a coaxial cable.

3. A transmitter for use in a cable system, the cable system providing cable television signals on channels, each channel including a television signal bandwidth and a return bandwidth, the return bandwidth being exclusive of the television signal bandwidth, the transmitter providing data signals between 50–550 MHz in the return bandwidth of one of the channels, wherein transmission of the data signals does not adversely affect the picture quality associated with the cable television signals.

4. The transmitter of claim 3, wherein the cable is a coaxial cable.

5. The transmitter of claim 1, wherein the data modulator includes a scambler.

6. The transmitter of claim 1, wherein the data modulator utilizes quadrature amplitude modulation to provide modulation of data signals.

7. The transmitter of claim 1, wherein the data modulator utilizes frequency shift key modulation to provide modulation of data signals.

8. The transmitter of claim 3, wherein the data signals provided by the transmitter are modulated.

9. The transmitter of claim 3, wherein the data signals are transmitted to an asynchronous transfer mode (ATM) network.

10. The transmitter of claim 3, wherein the data signals include requests for particular analog television signals.

11. The transmitter of claim 3, wherein the data signals include requests associated with internet web pages.

12. A method of communicating high speed data transmissions and cable television over a common line at a common frequency range, the method comprising:

transmitting cable television signals from a head end to a subscriber end on channels, the cable television signals being located within channels, each of the channels having a first bandwidth the cable television signals being within a second bandwidth within the first bandwidth; and transmitting data signals from the subscriber end to the head end the data signals being located within a third bandwidth within the first bandwidth of the channels, the second bandwidth being exclusive of the third bandwidth in each of the channels.

13. The method of claim 12, wherein the step of transmitting data signals utilizes a vestigial sideband.

14. The method of claim 12, further comprising transmitting data signals from the head end to the subscriber end.

15. The method of claim 12, wherein the data signals do not interfere with television signals.

16. The method of claim 5 wherein the step of transmitting the data signals utilizes channels between 50–550 MHz.

17. The method of claim 12, wherein the step of transmitting cable television signals comprises utilizing a single sideband technique, wherein only one sideband contributes to the recovery of the information encoded on the cable television signal.

18. The method of claim 12, wherein the third bandwidth is less than 0.75 MHz.

19. The method of claim 12, further comprising a step of removing transmitted cable television signals utilizing echo-canceling techniques.

20. The method of claim 12, wherein the step of transmitting data signals occurs simultaneously with the step of transmitting cable television signals.

* * * * *